Oct. 7, 1969   N. B. AGDUR ET AL   3,470,734
APPARATUS FOR MEASURING THE SURFACE WEIGHT OF A MATERIAL
Filed Aug. 22, 1966   4 Sheets-Sheet 1

Oct. 7, 1969     N. B. AGDUR ET AL     3,470,734
APPARATUS FOR MEASURING THE SURFACE WEIGHT OF A MATERIAL
Filed Aug. 22, 1966     4 Sheets-Sheet INVENTORS
NILS BERTIL AGDUR
PETER WEISSGLAS
BY Hans and Nydick
ATTORNEYS Oct. 7, 1969  N. B. AGDUR ET AL  3,470,734
APPARATUS FOR MEASURING THE SURFACE WEIGHT OF A MATERIAL
Filed Aug. 22, 1966  4 Sheets-Sheet 4
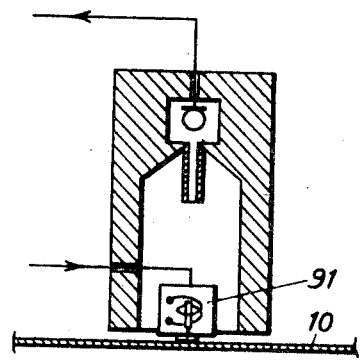
Fig. 9
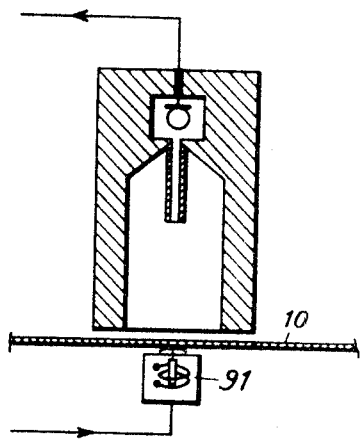
Fig. 10
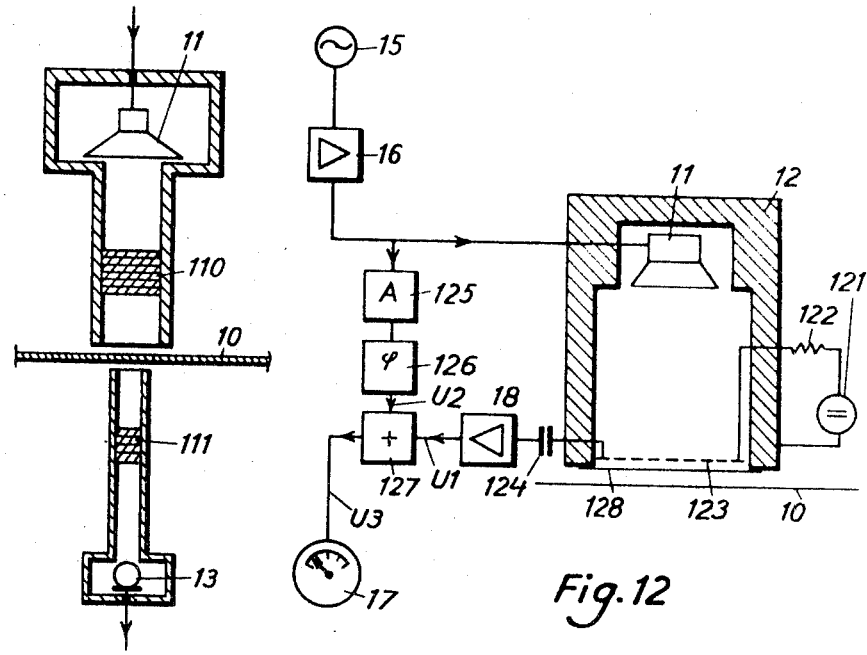
Fig. 11
Fig. 12
INVENTORS
NILS BERTIL AGDUR
PETER WEISSGLAS
BY Harris and Nydick
ATTORNEYS

United States Patent Office 3,470,734
Patented Oct. 7, 1969

3,470,734
APPARATUS FOR MEASURING THE SURFACE
WEIGHT OF A MATERIAL
Nils Bertil Agdur, Danderyd, and Peter Weissglas,
Bollstanas, Sweden, assignors to Skandinaviska
Processinstrument AB, Stockholm, Sweden, a company of Sweden
Filed Aug. 22, 1966, Ser. No. 573,937
Claims priority, application Sweden, Sept. 3, 1965,
11,537/65
Int. Cl. G01n 9/24
U.S. Cl. 73—32 4 Claims

ABSTRACT OF THE DISCLOSURE

An apparatus for measuring the mass per unit area of sheet material includes a transducer for inducing vibrations in the sheet material and a receiver for receiving signals indicative of the state of vibration in the material. The receiver is connected to an indicating device which is calibrated to indicate the mass per unit area as a function of the received signals.

---

The present invention relates to apparatus for measuring the mass per unit area of a sheet of material.

An object of the invention is to provide an arrangement which is simple and inexpensive to construct, reliable and positive in operation and simple to maintain while, at the same time, having a measuring accuracy which is fully satisfactory with respect to requirements for instance, in board, paper and plastics engineering.

The apparatus according to the invention is characterized by a source of vibration adapted to cause the material to vibrate and by a receiver intended to receive a signal including a parameter characterizing the state of the oscillation of the material. The receiver is connected on its output side to an indicating instrument so designed to indicate the surface weight of the material.

Figure 1:
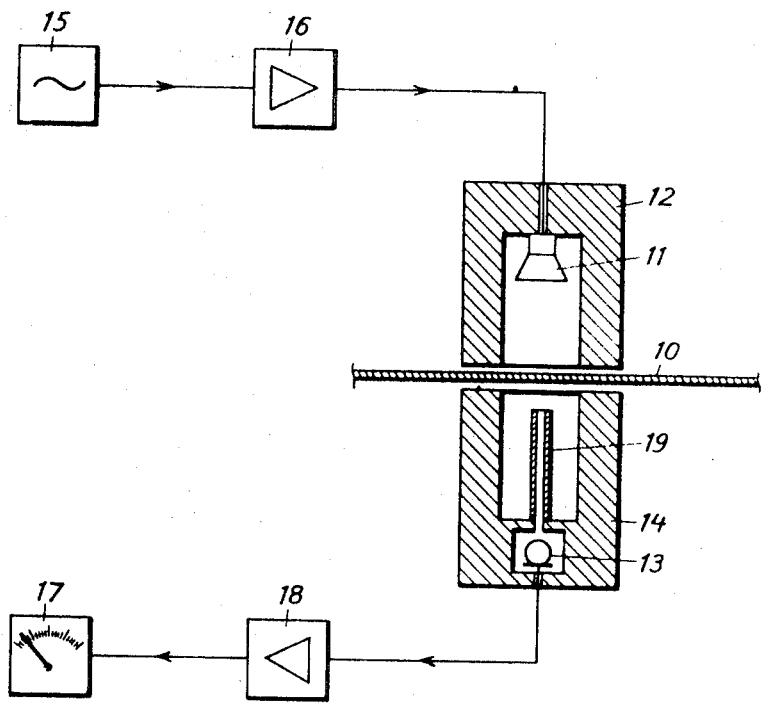
Figure 2:
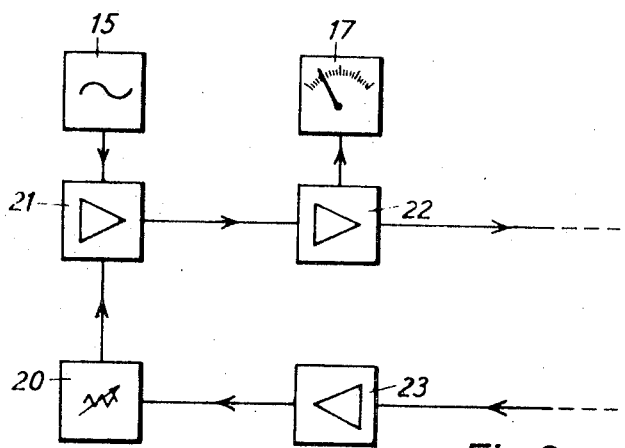
Figure 3:
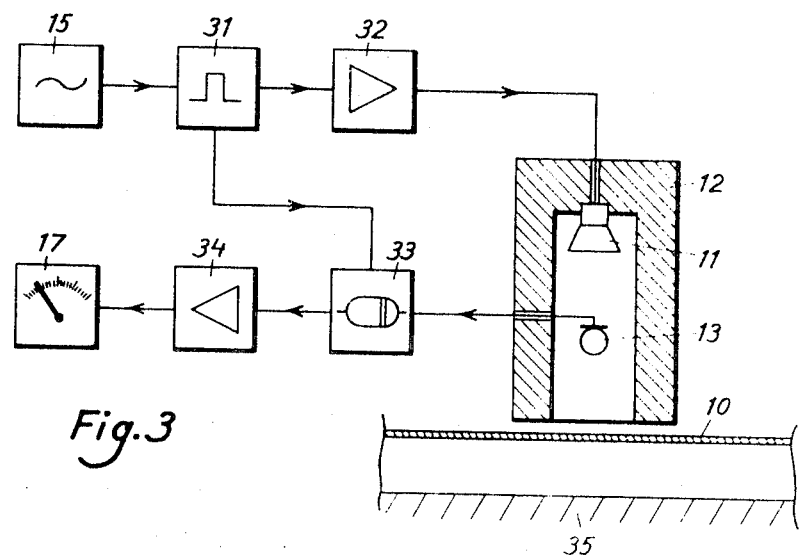
Figure 4:
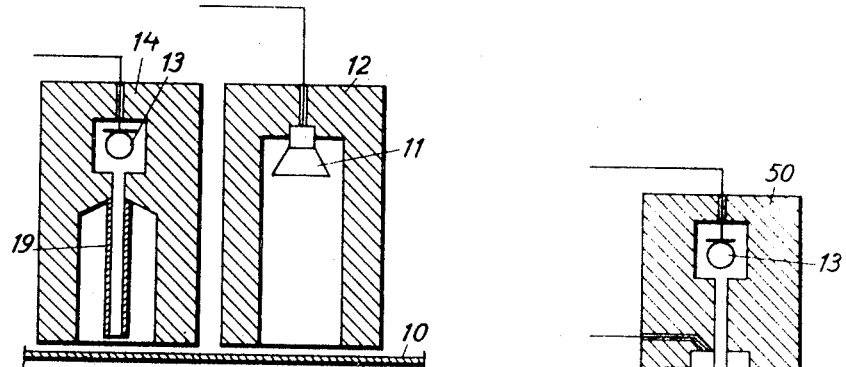
Figure 5:
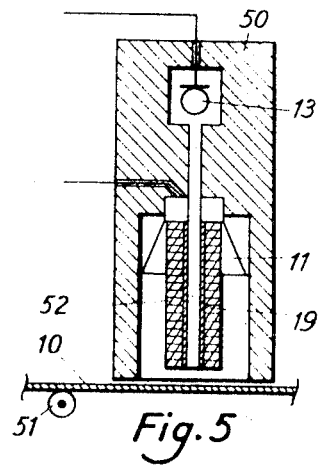
Figure 6:
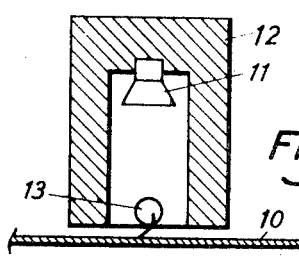
Figure 7:
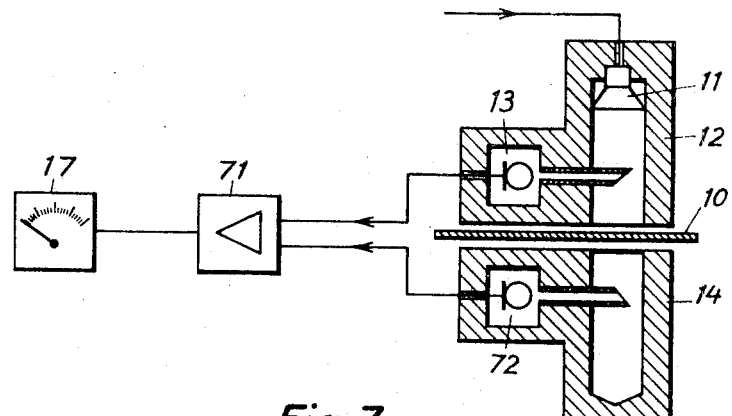
Figure 8:
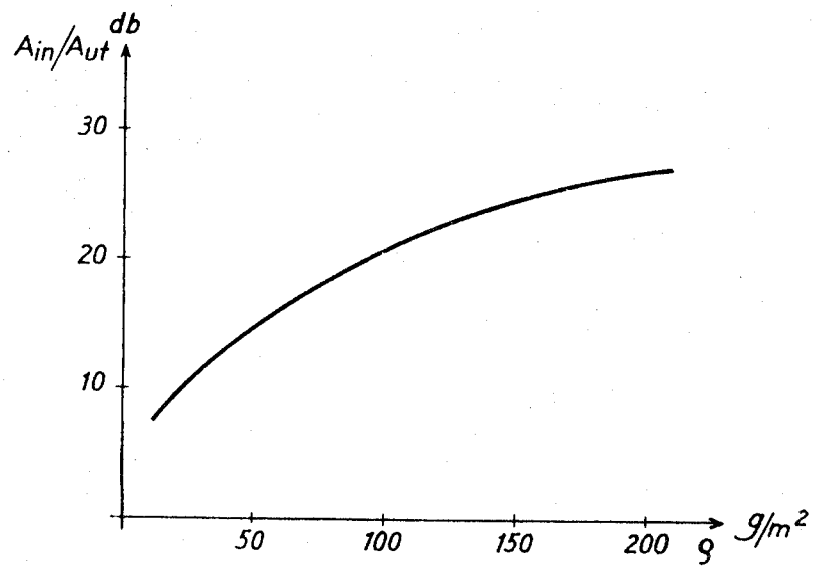

The invention will be more specifically described in connection with the accompanying drawings where FIG. 1 diagrammatically illustrates an example of an embodiment of apparatus according to the invention, provided with a source of sound and a sound receiver located on opposing sides of the material under test; FIG. 2 illustrates diagrammatically a modification of the electronic equipment in the apparatus according to FIG. 1; FIG. 3 shows another embodiment of apparatus according to the invention having a source of sound and a sound receiver located on the same side of the material under test; FIGS. 4–6 show different modifications in the positioning of the sound source and sound receiver in the apparatus according to FIG. 3; FIG. 7 shows a third example of an embodiment of apparatus according to the invention, having a sound source and a sound receiver located on one side of the material under test, and a second sound receiver situated on the other side of the material; FIG. 8 shows a graph, characteristic for apparatus according to the invention, for $A_{in}/A_{out}$ in db as a function of P in grams/m.$^2$, where $A_{in}$ represents input primary sound-energy, $A_{out}$ represents output secondary sound-energy and P the required surface weight; FIGS. 9–10 show two modifications having a source of vibration connected directly to the material, FIG. 11 shows a modification provided with damping material; and FIG. 12 shows another embodiment of the invention.

The arrangement according to FIG. 1 continuously determines the surface weight of paper during the final phase in the manufacturing process, in a paper machine of a type known per se. The paper machine proper is not shown; only a portion of the paper 10 together with the measuring apparatus. The measuring apparatus includes a sound source 11, arranged in the upper portion 12 of a cylindrical housing, made of acoustic insulating material, a sound receiver 13, arranged in a lower portion 14 of the housing, similarly made of an acoustic insulating material, a tubular portion 19 extending from the sound receiver 13 to an area relatively close to the paper 10, an energy source 15, an amplifier 16, an indicating instrument 17 and an amplifier 18. The energy source 15 emits a sinusoidal voltage having, e.g. a frequency of 15 kHz. to the amplifier 16, which emits a constant A.C. voltage having, for instance, an amplitude of one volt to the sound source 11. In turn the source of sound emits primary sound-energy to the paper 10, at substantially a constant level. The paper is caused to vibrate by the primary sound-energy, and emits secondary sound-energy. This energy passes through the tube 19 to the sound receiver 13 which converts the mechanical sound-energy into electrical energy, which is supplied to the indicating instrument 17, via the band pass amplifier 18 (tuned to 15 kHz.). As indicated diagrammatically in FIG. 1, the indicating instrument can be a needle-type indicator, calibrated and graduated in gram/m.$^2$. If the primary energy generated by the sound source (loudspeaker) 11 has a wavelength $\lambda$ substantially smaller than the dimensions of the cylindrical portion 12, portion 12 will be well insulated against sound preventing reflections and standing waves.

The electronic equipment shown in FIG. 2 is intended to function together with a source of sound 11 and a sound receiver 13 according to FIG. 1. This equipment, as in FIG. 1, has an energy source 15, an indicating instrument 17 and, in addition an amplifier 23 for the signal arriving from the sound receiver, also an automatic volume control 21–20 which is controlled by the signal from the amplifier 23 so that the signal level of the sound receiver is constant, and which controls the signal from the energy source 15 to a power amplifier 22. Consequently, the automatic volume control causes energy to be supplied to the sound source 11 as a function of the surface weight of the paper 10 (see FIG. 1) being measured, in such a way that the energy received by the sound receiver 13 is at a constant level during measurement. The indicating instrument 17 connected to the power amplifier 22 senses said function, and is graduated, e.g. direct in gram/m.$^2$.

The arrangement according to FIG. 3 is also provided with a source of sound 11, a sound receiver 13, an energy source 15 and an indicating instrument 17, but in this case the sound source 11 and the sound receiver 13 are disposed in the same cylindrical upper portion 12 of the housing with the sound source 11 situated farthest away from the paper web 10. Located on the opposing side of the paper web 10 and parallel to the plane of the same is a reflector 35. The energy source 15 emits a sinusoidal voltage to the pulse circuit 31 which supplies pulses of accurately determined amplitudes and duration to a power amplifier 32. The pulse circuit 31 also controls (opens) a gate 33, which, with a certain delay, forwards a signal arriving from the sound receiver 13, to an amplifier 34 which in turn influences the indicating instrument 17. The delay of the gate circuit 33 is so chosen that the gate circuit 33 does not open to transmit the energy received by the sound receiver until a signal reflected by the reflector 35 returns to the paper web 10 and causes it to vibrate. It is therefore important that no signal is sent from the sound source 11 when the sound receiver 13 receives energy, a fact which thus determines the relation between pulse length and pulse repetition frequency of the signal from the circuits 31 and 32.

In the modification shown in FIG. 4 the sound source 11 and sound receiver 13 are situated on the same side of the paper web 10 but in this case source 11 and receiver 13 are each positioned in their individual acoustic shielding positions 12 and 14, resp. Primary sound energy generated by the sound source 11 causes the paper 10 to vibrate, giving rise to secondary sound energy which reaches the sound receiver 13 via the tube 19. The same electronic equipment shown in FIG. 1 is suitably connected to the units 11 and 13.

The modification shown in FIG. 5 resembles the arrangement according to FIG. 4 insomuch as the sound source 11 and sound receiver 13 are situated on the same side of the paper 10, but, similarly to the arrangement according to FIG. 3, they are disposed in the same shielding portion 15 with the sound source 11 nearest the paper web and the sound receiver 13 concentrically arranged with respect to sound source 11. The paper web 10, running over a roller 51, is caused to vibrate by primary sound-energy arriving from the sound source 11, the vibration of the paper creating secondary sound-energy which is led to the sound receiver 13 via the tube 19. The tube 19 is well insulated with respect to the sound source 11 by means of acoustic damping material 52.

The modification shown in FIG. 6 is provided with the sound source 11 and the sound receiver 13 situated on the same side of the paper 10 and in the same acoustic insulating casing portion 12, but in this case the sound receiver is so designed that it senses directly the vibrations of the paper 10. The sound receiver is shown diagrammatically as a pick-up abutting the paper, but it is also possible to utilize an optical interferometer system which reads the amplitude of the oscillations of the paper.

The arrangement according to FIG. 7 includes a sound source 11 and a sound receiver 13 situated on the same side of the paper 10 and, furthermore, an additional sound receiver 72 on the other side of the paper web. The outputs of the two sound receivers 13 and 72 are connected to a differential amplifier 71 which, in turn, influences the indicating instrument 17.

The graph shown in FIG. 8 is characteristic for an arrangement according to the invention, utilized for measuring paper, plastic or the like having a surface weight varying between 50 and 200 grams/m.$^2$.

When apparatus according to the invention is used in conjunction with paper manufacture the portions which enclose the sound source and sound receiver may become coated with particles of dust. For this reason it is suitable to maintain a certain positive pressure within such portions.

If, for instance, an arrangement according to FIG. 1 is used in conjunction with paper manufacture is is suitable to allow the portions 12–14 of the apparatus to move to and fro over (under) the total width of the paper web, since in this way a more adequate expression for surface weight of the manufactured paper is obtained. In the description of the arrangement according to FIG. 1 it was stated that the amplifiers 16 shall constantly maintain the energy fed to the sound source 11 so that the calibration of the instrument 17, which is only calibrated once, is reliable. It can also be mentioned that if the apparatus portions 12–15 are allowed to move to and fro over the total width of the paper web and, furthermore, some small distance outside both longitudinal edges of said web, there is the possibility of utilizing the direct sound transmission between the sound generator 11 and the sound receiver 13, to correct the zero adjustment of the instrument 17, either electrically or mechanically. Such an adjustment can thus be effected as often as once a minute or every other minute. This naturally greatly increases the reliability of the arrangement.

In conjunction with FIG. 1 it was stated that the sound source 11 is supplied with energy at a constant level from the amplifier 16. The measuring accuracy is naturally enhanced if the arrangement is provided with means for constantly maintaining the energy, intended to cause the material 10 to vibrate and supplied from the sound source 11. In practice this can easily be arranged by means of e.g. a mechanical probe which senses directly the vibration amplitude of the sound generating diaphragm.

The modifications shown in FIG. 9 and 10 have a source of sound comprising an acoustic probe 91 positioned in direct mechanical contact with the material web 10. Sound energy is excited piezoelectrically in the probe 91; the energy being transferred directly in the form of vibrations to the material, without the intermediation of air. In FIG. 9 the sound source and sound receiver are located on the same side of the material 10, whereas in FIG. 10 they are situated on opposing sides of the material 10.

When measuring material with, e.g., a fabric structure it is suitable to position the fabric over a diaphragm or between two diaphragms. Naturally in this way the total surface weight for the combinations of fabric and diaphragm is measured, but due to the calibration of the indicating instrument the surface weight of the fabric is obtained directly.

The portions 12 and 14 of the housing in the aforementioned embodiments are conceived to be made from acoustic damping material and to have cross-section dimensions exceeding a sound wavelength of the energy arriving from the sound source. Non-damping material, e.g. metal tubing, can also be used for the casing portion, their cross dimensions being less than one half of the sound wavelength. However, in this case damping material should be inserted between the material 10 and the sound source, and between the material 10 and the sound receiver. Such an arrangement can be seen in FIG. 11 where gaskets 110 and 111 made of acoustic damping material, are inserted in the casing portions.

When applying the embodiment in which the transmitter and the receiver are situated on different sides of the material whose surface weight is to be determined, the casing portions for transmitter and receiver, resp., should suitably be designed so that their cross-section dimensions are substantially different. FIG. 11 illutrates the case where the dimensions of the casing portion of the receiver are smaller than that of the transmitter.

As with the arrangement according to FIG. 1 the arrangement shown in FIG. 12 has a high frequency source of energy 15, an amplifier 16, a cylindrical upper portion 12 of the housing provided with a source of sound 11, an amplifier 18 and an indicating instrument 17. Further, the arrangement includes a D.C. voltage source 121 connected, via a resistance 122, between the portion 12 and a rigid perforated plate 123 which constitutes the one electrode in a capacitor 123–128; a diaphragm 128 covering a casing portion 12, the diaphragm constituting the second electrode in the capacitor, a capacitor 124 connected between the input of the amplifier 18 and the plate 123, summing circuit 127, the output of which is connected to the indicating instrument 17 and one input of which is connected to the output of the amplifier 18; and an amplitude control circuit 125 and a phase control circuit 126 which are connected in series between the output of the amplifier 16 and the other input of the addition circuit 127.

The diaphragm 128 is caused to oscillate by the energy radiating from the source of sound 11, and the oscillations actuate the paper web 10, which is acoustically connected to the diaphragm via a layer of air of thickness $d$. Hence an A.C. voltage $U_1$, the amplitude and phase of which varies as a function of the thickness $d$ and the surface weight of the paper web 10, is passed to one input of the summing circuit 127.

An A.C. voltage $U_2$ is supplied to the output input of the summing circuit 127. Voltage $U_2$ has such an amplitude and phase that the voltage $U_3 = U_1 + U_2$ on the output of the summing circuit has an amplitude which is dependent on the surface weight of paper but independent of the thickness $d$. Consequently, when measuring a new type of paper the circuits 125 and 126 are adjusted, once only, after which a reading of the possibly varying, surface weight of the paper 10 is obtained on the indicating instrument 17.

We claim:

1. Apparatus for measuring the mass per unit area of sheet material, said apparatus comprising in combination:
    a pulse source for generating pulses of accurately defined amplitude and duration and with pulse intervals between said pulses;
    a sound transducer connected to be driven by said pulse source for transmitting sonic energy having a given level to said sheet material, to induce vibrations therein, said transducer being a given distance from said sheet material;
    a sound receiving means for producing a signal in response to the resultant vibration of said sheet material, said signal having a level which varies relative to the corresponding level of the sonic energy transmitted by said sound transducer, said receiver being positioned less than said given distance from said sheet material;
    a gate having a signal input connected to said sound receiving means, a signal output and a control input, said gate transmitting signals from said signal input to said signal output only when a pulse is present at said control input;
    a delay means connecting said pulse source to said control input of said gate; and
    indicating means connected to said signal output of said gate to give an indication of the relative value of said levels and thus of the value of the mass per unit area of said sheet material whereby said indication of said mass is independent of movement of said sheet material.

2. The apparatus of claim 1 further comprising means for maintaining the level of the sonic energy transmitted by said transducer constant.

3. An apparatus according to claim 1, wherein the transducer and the receiver are disposed on the same side of a region in which sheet material can be tested.

4. An apparatus according to claim 3, wherein the transducer and the receiver are in a common acoustically insulated housing.

References Cited

UNITED STATES PATENTS 3,350,924   11/1967   King.
2,527,208   10/1950   Berry et al. _____ 73—6

RICHARD C. QUEISSER, Primary Examiner

JOHN K. LUNSFORD, Assistant Examiner

U.S. Cl. X.R.

73—159